United States Patent
Peissig et al.

(10) Patent No.: US 8,949,744 B2
(45) Date of Patent: Feb. 3, 2015

(54) CONTROL SYSTEM, EARPHONE AND CONTROL METHOD

(75) Inventors: Jürgen Peissig, Hannover (DE); Daniel Schlessinger, Berkeley, CA (US); Heiko Zeuner, Bernau (DE)

(73) Assignee: Sennheiser electronic GmbH & Co. KG, Wedemark (DE)

( * ) Notice: Subject to any disclaimer, the term of this patent is extended or adjusted under 35 U.S.C. 154(b) by 788 days.

(21) Appl. No.: 13/142,593

(22) PCT Filed: Dec. 29, 2009

(86) PCT No.: PCT/US2009/069743
§ 371 (c)(1),
(2), (4) Date: Sep. 26, 2011

(87) PCT Pub. No.: WO2010/078372
PCT Pub. Date: Jul. 8, 2010

(65) Prior Publication Data
US 2012/0002822 A1    Jan. 5, 2012

(30) Foreign Application Priority Data

Dec. 30, 2008 (DE) .................... 10 2008 055 180

(51) Int. Cl.
*G06F 3/033* (2013.01)
*H04R 1/10* (2006.01)
(Continued)

(52) U.S. Cl.
CPC ............ *H04R 1/1041* (2013.01); *G06F 3/012* (2013.01); *H04S 7/304* (2013.01); *H04S 7/303* (2013.01); *H04R 5/033* (2013.01); *H04R 2430/01* (2013.01); *H04S 2400/13* (2013.01)
USPC ........................................ 715/863

(58) Field of Classification Search
CPC ......... H04S 7/303; H04S 7/304; G06F 3/012; G06F 3/017; G06F 1/1694; H04R 2460/07; H04R 2430/01; H04R 1/1041
USPC ........................................ 715/863
See application file for complete search history.

(56) References Cited

U.S. PATENT DOCUMENTS 5,426,450 A * 6/1995 Drumm .................... 345/168
6,184,847 B1 * 2/2001 Fateh et al. ................. 345/8

FOREIGN PATENT DOCUMENTS

ES    2283208 A1    10/2007
GB    2415486 A     12/2005
(Continued)

OTHER PUBLICATIONS

International Search Report corresponding to the PCT application No. PCT/US2009/069743, date of mailing Mar. 15, 2010, 3 pages total.
(Continued)

*Primary Examiner* — Duc Nguyen
*Assistant Examiner* — Kile Blair
(74) *Attorney, Agent, or Firm* — Kilpatrick Townsend & Stockton LLP

(57) ABSTRACT

There is provided a control system (1) comprising an earphone (2) and a processing device (3). The control system (1) has a processing device (3) for the evaluation of head movement information and/or head position information. In that case the processing device is adapted to output at least one control signal dependent on the evaluation, wherein the earphone has a sensor device (9a, 9b, 9c) for detecting the movement information and/or position information and a transmitting device (10) for transmitting the movement information and/or the position information to the processing device.

14 Claims, 5 Drawing Sheets

Figure 1:
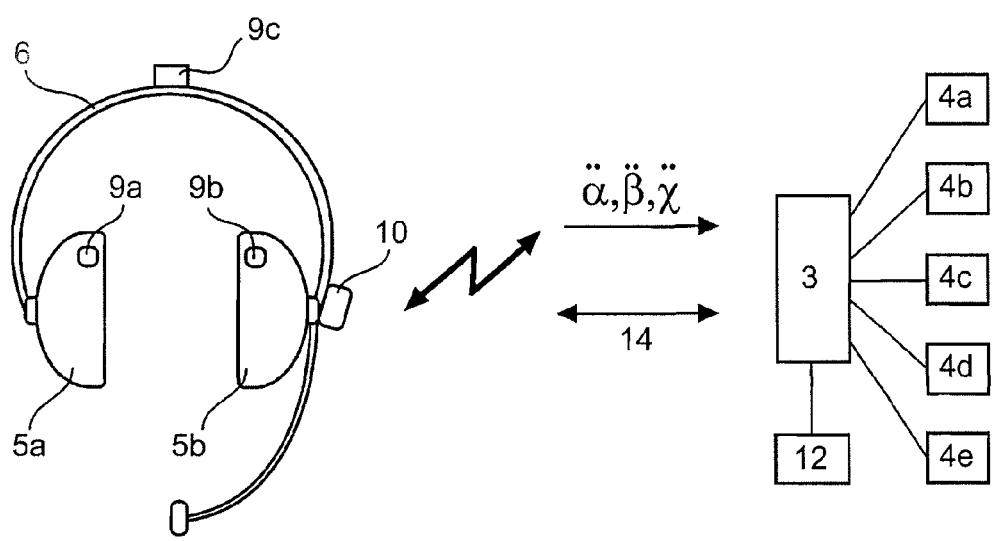

(51) Int. Cl.
  *G06F 3/01* (2006.01)
  *H04S 7/00* (2006.01)
  *H04R 5/033* (2006.01)

(56) References Cited

FOREIGN PATENT DOCUMENTS

| JP | H09-081785 A | 3/1997 |
|---|---|---|
| JP | H11-161190 A | 6/1999 |
| JP | H11-283474 A | 10/1999 |
| JP | 2004-233909 A | 8/2004 |
| WO | WO 2007/082969 A1 | 7/2007 |
| WO | WO 2008/073801 A2 | 6/2008 |

OTHER PUBLICATIONS

Non-Final Office Action for Japanese Patent Application No. 2011-543722 mailed on Sep. 10, 2013, 2 pages.

\* cited by examiner

CONTROL SYSTEM, EARPHONE AND CONTROL METHOD

CROSS-REFERENCE TO RELATED APPLICATIONS

This application is a U.S. National Stage of PCT Application No. PCT/US2009/069743, filed Dec. 29, 2009, which claims the benefit of German Application No. 102008055180.5, filed Dec. 30, 2008, the contents of both applications are hereby incorporated by reference in their entirety for all purposes.

This application claims priority to German Patent Application No. 102008055180.5, filed Dec. 30, 2008, the disclosure of which is hereby incorporated by reference in its entirety.

The invention concerns a control system, an earphone and a control method.

A series of what are referred to as man-machine interfaces are known from the state of the art. In that respect a human being generally controls a technical apparatus. An example of such a control arrangement is the computer mouse. A user uses his hand to move the mouse over a flat surface. A sensor in the mouse measures that movement and passes that movement to a processing unit, for example a computer, which assesses that movement information. On the basis of that assessment a mouse pointer or a cursor is then moved on a display.

A further example is the operation of a portable MP3 player. It has for example buttons at the surface, which can be pressed with the hand of a user to achieve desired effects such as for example adjusting volume or selection of the song that the user would like to hear.

A problem of the present invention is to provide a control system with which a user can advantageously control a technical device.

That problem is solved by a control system according to claim 1, an earphone according to claim 8 and a control method according to claim 9.

According to the invention there is thus provided a control system having an earphone with a sensor device for detecting (the items of) head movement information and/or head position information and a transmitter device for transmitting (the items of) head movement information and/or (the items of) head position information for fixing to at least one body portion of a user and a processing device for evaluating (items of) movement information and/or position information. The processing device is adapted to output at least one control signal which is dependent on the evaluation.

The basic concept of the invention is that of providing a control system with which a technical device is controlled by given movements, positions or movement patterns of a head on which an earphone or a headset is fixed.

In regard to the earphone or the headset it is significant that it can be fixedly connected to a body portion of a user. The fixed connection of the earphone or the headset to a head of a user can be used to detect (items of) position information and/or movement information in respect of the body portion.

A sensor device which is fixedly secured to the earphone or the headset serves to detect items of movement information and/or position information. The sensor device can have sensors such as for example acceleration sensors, travel distance sensors, gyrators, movement sensors and so forth. The (items of) movement and/or position information involve positions and/or movements of the head on which the sensor device is arranged, such positions and/or movements being detected by the sensor device or the sensors.

(Items of) head movement information include for example items of information which involve an inclining movement of the head forwardly or rearwardly, which occurs for example when nodding the head, a rotary movement towards the right or the left of the head as occurs for example when shaking the head, or also a head angling movement as occurs for example when moving the head towards the right or left shoulder. If the human head is modelled as a ball then those movements can be modelled as a rotary movement of that ball about a first, a second and a third axis which are perpendicular to each other. One of those axes then corresponds to the longitudinal axis of the body which extends through the centre point of the head. A further movement is the movement of the head in space, that is to say from a first point in space to a second point in space.

(The items of) head position information concern for example an instantaneous angle of inclination of the head forwardly, towards the right or to the side, that is to say the rotary angle about the above-mentioned three axes, one of which is the longitudinal axis of the body. A further (item of) head position information is for example the absolute position of the head in a space. In that case the head is viewed virtually as a point in space.

(The items of) movement information and/or position information detected by the sensor device can be transmitted to a processing device by way of a transmitting and/or receiving device. The transmitting and/or receiving device can include for example an antenna which transmits the items of movement information and/or position information to an external processing device. As an alternative thereto the transmitting and/or receiving device can be connected to the processing device by a cable. Equally however the processing device can also be disposed at or in the earphone. The processing device can also be connected to the sensor device by a wired connection. The processing device is adapted to evaluate the received (items of) movement information and/or position information. It is possible to link to the evaluation procedure for example the step of determining the head position (location in space, first, second and third angles of inclination about first, second and third axes) and/or the head movement (movement in space, first, second and third rotary movements about first, second and third axes). Those values can be referred to as head movement parameters and/or head position parameters.

The processing device can further be adapted to recognise from the items of movement information and/or position information or from parameters derived therefrom such as for example (items of) head movement information, head position information and head movement parameters and head position parameters, movement patterns on the part of the head of the user on which the earphone is disposed. For example it is possible to recognise a head shaking movement, a head nodding movement, a head circling movement or the like. For that purpose the processing device can be so preset that it recognises certain movement patterns, but it is also possible for the processing device to be so designed that a user can teach it certain movement patterns, for example in such a way that in a training mode the user performs a movement pattern with the movement detection device, the processing device notes the corresponding (items of) movement and/or position information or parameters or the time succession thereof and thus recognises the movement upon renewed execution thereof in a control mode.

Preferably accordingly the processing device has a training mode and a control mode.

The control system can be used for example in the following specified applications: in conjunction with headphones or a headset, wherein audio reproduction is controlled for the user of the headphones or headset. In the conjunction of the control system with headphones or a headset it is also possible to implement a monitoring procedure, for example insofar as, when the head is turned towards a given element, for example a musical instrument, that musical instrument is presented more loudly than other musical instruments. The control system can for example also be used to control a mouse pointer or cursor on a monitor.

In accordance with a development of the invention the processing device is adapted to recognise a movement pattern from the (items of) movement information and/or position information and to output at least one control signal dependent on the recognised movement pattern. Thus movement patterns of a body portion of a user, which can also be referred to as gestures, can be used to control a technical device.

A control signal can also be determined or outputted in dependence on a given head attitude position. In the case of evaluating (items of) head movement information and/or head position information, a control signal can be outputted for example when there is a given angle of inclination or when there are a plurality of given angles of inclination (first, second and third angles of inclination about the first, second and third head axes).

Movement patterns in the case of a head movement can be for example: nodding the head, circling the head, angled positioning of the head or shaking the head.

The processing device can also be adapted to recognise such attitude positions or such movement patterns, that is to say the processing device has a memory unit in which predefined attitude positions and/or predefined movement patterns are stored, and a comparison of the currently existing items of movement information and/or position information with the stored data leads to recognition of the specified movement patterns or attitude positions.

In accordance with a development of the invention the processing device can be operated in a training mode in which the processing device can learn movement patterns and/or attitude positions. In that case for example with a movement detection device, an attitude position of a body portion or a movement pattern of a body portion can be detected. The (items of) movement information and/or position information which are recorded in that case are provided for the processing device in the training mode, which means that the processing device stores those data and remembers them as a movement pattern or an attitude position. In an operating mode the processing device would then be able to recognise a corresponding attitude position or a corresponding movement pattern.

Recognition is effected for example by a comparison of the data generated by the attitude position or the movement pattern with the stored data which belong to a movement pattern or an attitude position. If the difference in respect of those data is less than a given limit, the processing device recognises a corresponding attitude position or a corresponding movement pattern. A given control signal is then associated with the movement pattern and/or the attitude position.

In accordance with a development the at least one control signal depends on the time duration of a movement pattern or an attitude position. For example a movement pattern such as a head nodding movement can be recognised and a control signal outputted, which increases the volume. The longer the head nodding movement continues, the correspondingly louder is the loudspeaker setting. That is different from the situation in which an attitude position or a movement pattern is recognised and thereupon a given effect is achieved, for example switching on to a further song. In that way the control arrangement is more flexible and more pleasant for the user.

In a development of the invention the processing device has a filter for filtering the (items of) movement information and/or position information, wherein the filter is adapted to weight (items of) movement information more highly than items of position information. Such a filter provides for automatic readjustment of a 'zero point setting'. Particularly in the case of movement patterns there is generally no need for precise determination of position, over a prolonged period of time. Parameters such as instantaneous acceleration and instantaneous speed are more suitable for uniquely determining a movement pattern than the precise location. In the case of head control for example the forward direction of a head can be readjusted by means of such a filter. If a head is looking in a first direction for a certain time, that is assumed to be a starting point for the head movement. If the head is looking in a different direction for a prolonged period of time, that fresh direction is assumed to be the new starting point.

In a development the processing device has a compensating filter for filtering the (items of) movement information and/or position information, wherein the filter is adapted to compensate for particularities of the sensor device. Accordingly for example it is also possible to compensate for systematic errors or inaccuracies in the sensors or sensor device used. That improves the quality of movement pattern recognition or the recognition of an attitude position.

In accordance with a further aspect of the present invention there is provided an activation or deactivation unit for either activating or deactivating the sensor device or activating or deactivating the transmitting and/or receiving device. That activation unit can be represented as an actuating or operating element for example in the form of a knob. It is thus possible to deactivate detection of head movements. That can be appropriate in particular when the user is for example involved in sporting activity.

The activation and deactivation unit can be activated and deactivated respectively for example by a particular succession of head movements. Deactivation of the sensor device and/or the transmitting and/or receiving device makes it possible to prevent control commands performed in error. Further configurations of the invention are subject-matter of the appendant claims.

Preferred embodiments of the invention are described hereinafter with reference to the drawing.

Figure 2A:
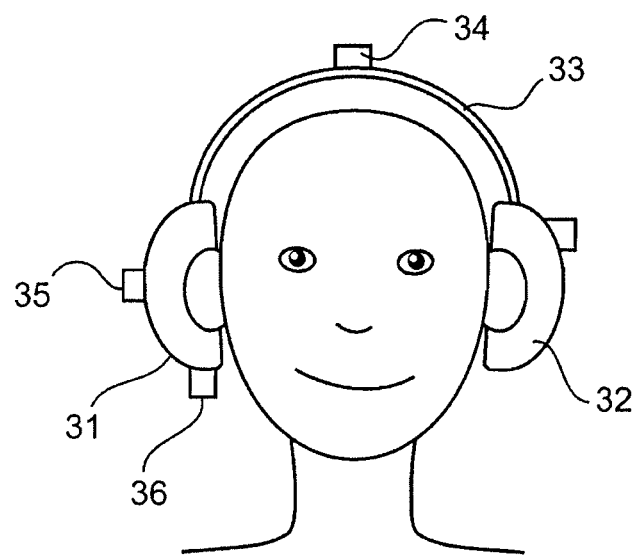
Figure 2B:
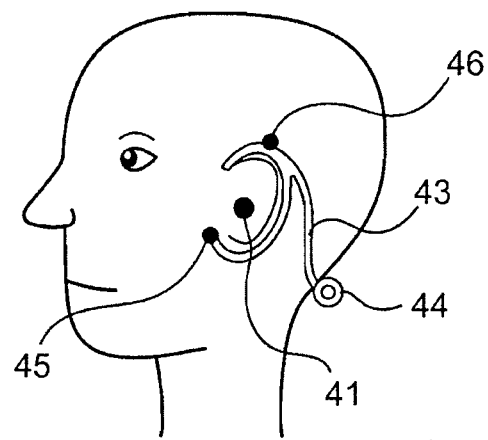
Figure 2C:
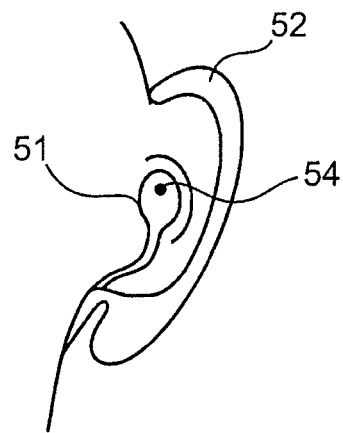
Figure 2D:
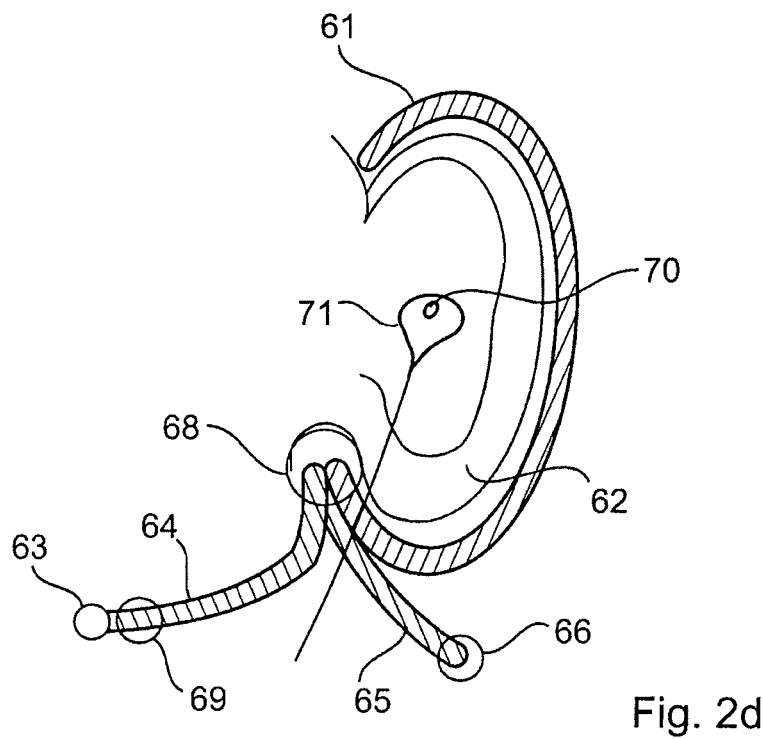
Figure 3:
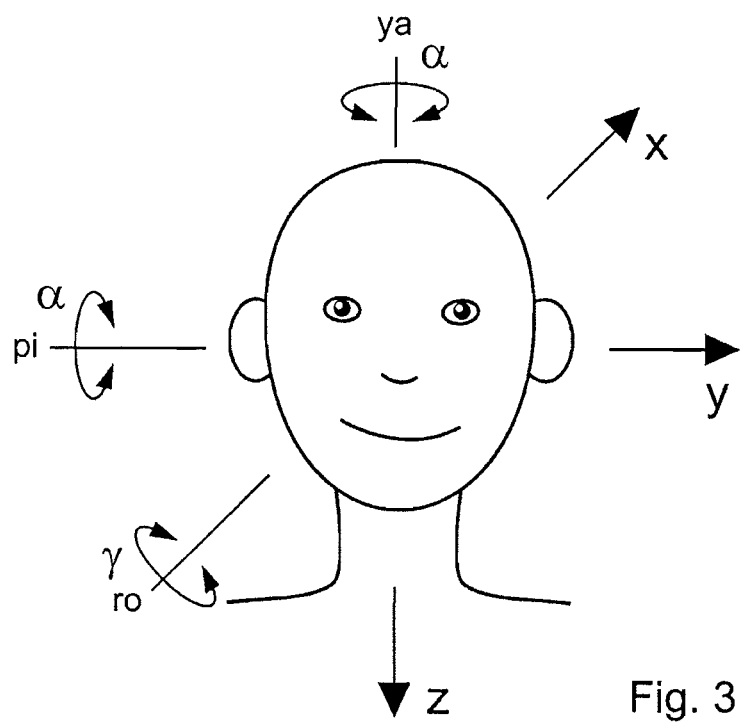
Figure 4A:
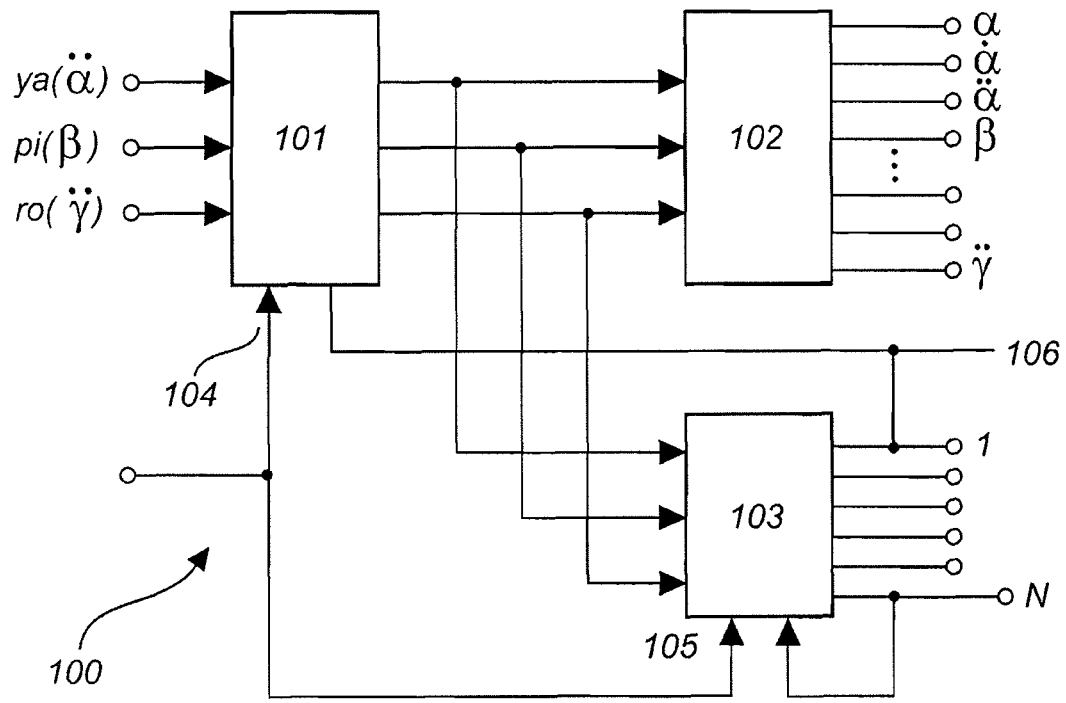
Figure 4B:
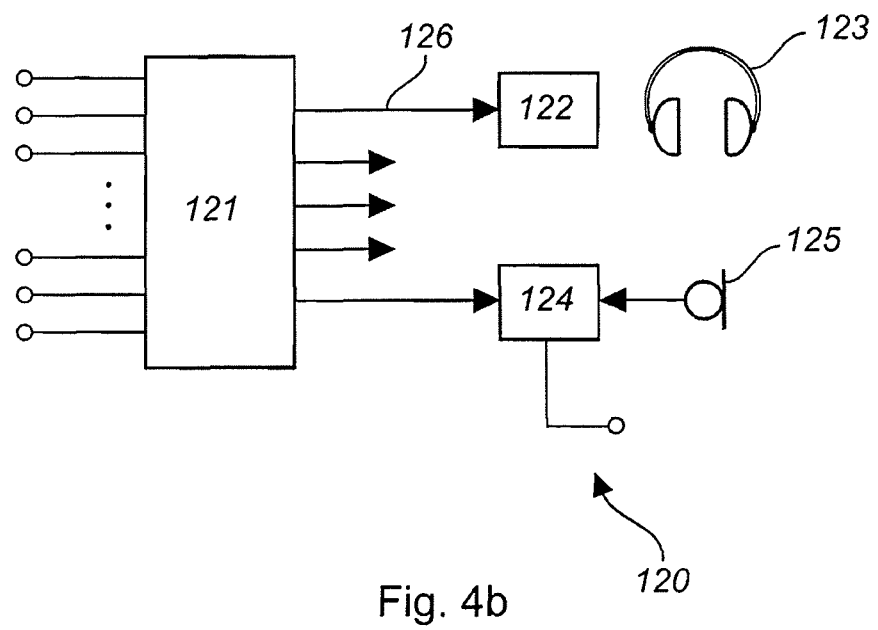
Figure 5:
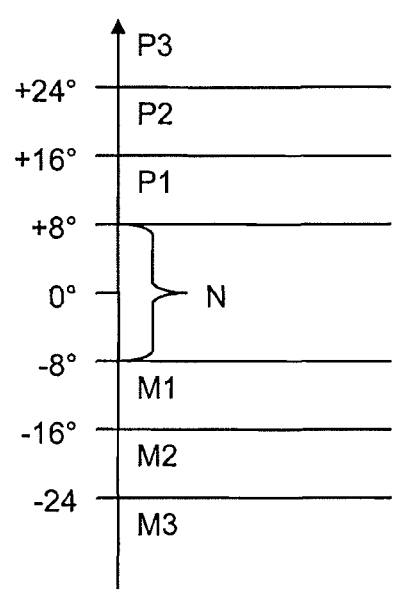

FIG. 1 shows a diagrammatic view of a control system in accordance with a first embodiment, FIGS. 2*a* to 2*d* show diagrammatic views of earphones in accordance with second to fifth embodiments, FIG. 3 shows a diagrammatic and parameterised view of a head movement, FIG. 4*a* shows a block circuit diagram of a processing device in accordance with a sixth embodiment, FIG. 4*b* shows a block circuit diagram of a driver for a processing device in accordance with a sixth embodiment, and FIG. 5 shows a diagrammatic view of division of an angle of inclination into a plurality of zones in accordance with the sixteenth embodiment.

FIG. 1 shows a diagrammatic view of a control system in accordance with a first embodiment of the invention. The control system 1 has a headset 2 (movement detection device), a processing unit 3 and further devices which can optionally be connected to the processing unit 3. Those devices can be for example a computer/laptop 4a, an MP3 player/iPod 4b, an aircraft cockpit 4c, a home stereo system 4d or a telephone 4e.

The headset 2 has a first earphone capsule 5a and a second earphone capsule 5b. The two earphone capsules 5a and 5b can optionally be connected together by way of a band 6. The headset 2 further optionally has a microphone 7 and optionally a microphone holder 8. Acceleration sensors 9a, 9b and 9c are arranged on the headset 2. The acceleration sensors 9a, 9b and 9c are connected to a transmitting and/or receiving device 10. When the headset is fixed to the head of a user and when the user moves his head the acceleration sensors 9a, 9b and 9c detect accelerations of the head and pass same to the transmitting and/or receiving device 10. The detected (items of) acceleration information are sent to the processing unit 3 by the transmitting and/or receiving device 10. The connection between the transmitting device 10 and the processing unit 3 can be on the one hand wireless or wired. In addition it is also possible for the processing unit 3 to be arranged directly on or in the transmitting and/or receiving device 10 or associated therewith.

The processing unit 3 can be connected not only to the transmitting and/or receiving device 10 but it can also be connected to a further device, for example a computer/laptop 4a by way of a USB connection. The processing unit 3 can also be connected for example by way of a radio connection to an MP3 player 4b. Further devices which can be connected to the processing unit 3 by way of a radio connection and/or a cable connection are a cockpit 4c, a home stereo system 4d and a telephone 4e. In the case of a radio connection they have a suitable transmitting/receiving device. It can be possible in particular for a plurality of such devices to be also simultaneously connected to the processing unit 3.

The processing unit 3 receives the (items of) acceleration information 11 from the transmitting and/or receiving device 10 and evaluates them. That means in particular that movement patterns on the part of the head of the user can be recognised on the basis of the received (items of) acceleration information. Besides the movement patterns it is also possible to recognise movements of the head for example from a first position to a second position in space. The processing unit 3 can have a memory containing comparison data for given movement patterns. A comparison of the (items of) acceleration information 11 with the comparison data can lead to recognition of a given movement pattern.

The processing unit 3 can also be operated in a training mode in which certain movement patterns can be taught thereto. For example in the training mode with the headset 2, a given movement pattern is implemented and that is then characterised as such and stored in the memory 12. In the normal mode of operation the processing unit 3 then recognises the trained movement pattern. To increase the quality of recognition of a movement pattern certain movement patterns can also be trained a plurality of times. In that way a plurality of data sets are acquired for a movement pattern. In normal operation a movement pattern can be recognised for example by a deviation between the detected items of acceleration information 11 and the data sets contained in the memory in respect of the movement patterns being less than a given threshold value. The quality of movement pattern recognition can be adjusted on the basis of such a threshold value. Preferably such a threshold value is adjustable at the processing unit 3.

Corresponding control signals can then be associated with the recognised movement patterns, which control signals can be passed to a device, for example to the computer/laptop 4a, the MP3 player 4b, the cockpit 4c, the home stereo system 4d or the telephone 4e, by way of the appropriate connection between the processing unit 3 and the respective device. In the case of the computer/laptop 4a the control signals can be utilised for example to control the position of a mouse on a display screen or a computer game. In the case of the MP3 player 4b for example the volume, bass, treble or the selection of a piece of music can be controlled with the control signals. In the case of a cockpit 4c for example a given radio channel can be selected with the control signals. Such radio channels can include for example a communication with a control tower, with the passengers in the cabin or with given headsets which are worn by another flight attendant. The control signals can also control a home stereo system 4d and determine thereon for example volume, choice of device, for example choice of radio, CD, DVD and so forth, or also adjust treble, low-pitch notes, bass etc of an audio signal.

In the case of a connection to the telephone 4e for example a given, preferably preprogrammed telephone number can be selected with the control signals and thus a telephone connection can be established.

Preferably the processing unit 3 is connected to a plurality of such devices and a given movement pattern can also serve to select one of those connections. Thus for example in the case where an MP3 player 4b and the telephone 4e are connected to the processing unit, firstly it is possible to listen to music and in the case of a telephone call being received the connection to the telephone 4e can be selected by a given movement pattern and thus the telephone conversation can be accepted without music still being heard from the MP3 player.

The devices, for example the computer/laptop 4a, the MP3 player 4b, the cockpit 4c, the home stereo system 4d or the telephone 4e thus provide an output signal controlled by the control signals of the processing unit 3. Accordingly those output signals can be controlled by head movement patterns. The output signals of the devices given by way of example can then be sent directly to the headset or to a transmitting and/or receiving unit 10. Preferably however the processing unit 3 receives the output signals of the specified devices and forwards a corresponding signal, for example the audio signal 14, to the transmitting and/or receiving unit 10 of the headset. The audio signal 14 received in that way is then passed to the first and second earphone capsules 5a and 5b and a user can thus hear the desired audio signal, for example a given song of a given volume from the MP3 player or a received telephone conversation. In addition to the items of acceleration information 11, it is also possible for example for a speech signal recorded by the microphone 7 to be passed to the processing unit 3 so that the processing unit can pass that speech signal to for example the telephone 4e.

Items of head movement information include for example items of information concerning an inclining movement of the head forwardly or rearwardly, which occurs for example in a head nodding movement, a rotary movement of the head towards the right or the left as occurs for example in a head shaking movement, or a head angling movement as occurs for example when moving the head towards the right or left shoulder. If the human head is modelled as a ball those movements can be modelled as a rotary movement of the ball about first, second and third axes which are perpendicular to each other. One of those axes then corresponds to the longitudinal axis of the body which extends through the centre point of the head. A further movement is the movement of the head in space, that is to say from a first point in space to a second point in space.

The items of head position information involve for example an instantaneous inclination angle of the head forwardly, towards the right or to the side, that is to say the rotary angle about the above-mentioned three axes of which one is the longitudinal axis of the body. A further item of head position information is for example the absolute position of the head in space. In that case the head is virtually considered as a point in space.

On the basis of the recognised movement parameters and/or position parameters or the recognised movement patterns, the processing unit outputs at least one control signal dependent on such recognition. That control signal can control for example the volume of a sound signal, the selection of a sound signal, for example the skip forward and sip backward functions, sound effects in terms of music reproduction such as filters, pitch levels, fluctuations, vibrato, tremolo, emphasising certain music or speech contents, sound effects of an electrical instrument, cross-fade, that is to say crossing over two pieces of music. Equally that control signal can control a computer game or also an acoustic game.

FIG. 2a shows a diagrammatic view of an earphone in accordance with a second embodiment. A movement detection device is provided in an earphone or headphone. The headphone has a first housing for a first earphone capsule 31, a second housing for a second earphone capsule 32 and a band 33 connecting the first housing 31 to the second housing 32. A first sensor 34, preferably an acceleration sensor, is arranged approximately in the centre of the band 33. A second sensor 35 is preferably arranged centrally on the first housing 31. A third sensor 36 is preferably arranged beneath the first housing 31. In that way the preferred directions of head movement (for example head nodding, head shaking and head angling) can be particularly well detected. The movement detection device has the first, second and third sensors 34, 35, 26.

FIG. 2b shows a diagrammatic view in accordance with a third embodiment of the invention. A first earphone capsule or a first housing 41 is connected by way of a behind-the-neck band 43 to a second earphone capsule (not shown in FIG. 2b). A first sensor 44 is arranged approximately at the centre of the behind-the-neck band 43. A second sensor 45 is arranged in the lower region or approximately at the centre of the first earphone capsule or first housing 41. A third sensor 46 is preferably arranged upwardly or downwardly on the earphone capsule or the housing. The sensors 44, 45 and 46 preferably or by way of example involve acceleration sensors. Such an arrangement for the sensors supplies good movement information in respect of the head.

FIG. 2c shows a diagrammatic view of an earphone in accordance with a fourth embodiment. An in-ear earphone 51 with a housing and optionally a cable 55 is secured at or in an ear 52. A sensor 54 is arranged approximately centrally on the housing.

FIG. 2d shows a diagrammatic view of an earphone in accordance with a fifth embodiment of the invention. The earphone 60 has a holder or an earphone loop 61 which is secured around an ear 62. Arranged on the holder 61 is a microphone 63 which is carried by the carrier arm 64 and connected to the holder 61. A second carrier 65 is optionally fixed to the holder 61 and at its end has a first sensor 66. A second sensor 67 can be arranged on the holder above or in the upper region of the ear. A third sensor 68 can be arranged on the holder at a location which is somewhat in front of the ear lobe when the holder is being worn. A fourth sensor 69 can be arranged in the front region of the carrier arm 64, approximately in the proximity of the microphone 63. A fifth sensor 70 can be arranged for example centrally on an in-ear earphone 71. The illustrated sensor positions for the sensors 66, 67, 68, 69, 70 are preferred so that good movement detection is achieved. At the same time in particular the illustrated sensor positions are comparatively firmly connected to the head so that movements which are recorded by the sensors and which are related to movements of the holder 61 around the ear and not to head movements are minimised as much as possible. Likewise the arrangement of the fourth sensor 69 at the tip of the carrier arm 64 can provide that a given control signal is afforded by a movement pattern of the carrier arm 64, for example upwardly and downwardly or forwardly and rearwardly.

FIG. 3 shows a diagrammatic and parameterised view of a head movement. A first axis 91, a second axis 92 and a third axis 93 are defined on a head 90. The three defined axes 91, 92 and 93 are perpendicular to each other and form a spatial Cartesian co-ordinate system. The origin of that co-ordinate system is approximately at the centre of the head 9 if the head is viewed approximately as a ball. Rotation of the head about the second axis 92 approximately corresponds to a head nodding movement. The respective deflection about that axis 92 with respect to a zero point is identified by β or is referred to as pitch pi or inclining/nodding movement. The rotary angle of the head/ball 90 about the first axis 91 which substantially corresponds to a longitudinal axis of the body is denoted by α or yaw or as a yawing movement ya. The movement of the head 90 about the first axis 91 approximately corresponds to a head shaking movement. The rotary angle of the head 90 about the third axis 93 is denoted by γ or as roll or as a rolling movement ro. A movement of the head about the third axis 93 approximately corresponds to an angling movement of the head.

FIG. 4a shows a block circuit diagram of a processing unit 100 in accordance with a sixth embodiment. The processing unit 100 has a filter for mass and drift correction 101, an angle processing unit 102 and a head movement recognition unit 103. The input values of the drift filter 101 are the angular acceleration $\ddot{\alpha}$ (ya/$\ddot{\alpha}$ yaw), the angular acceleration $\ddot{\beta}$ (pi/$\ddot{\beta}$ inclining/nodding) and the angular acceleration $\ddot{\gamma}$ (ro/$\ddot{\gamma}$ rolling).

Inexpensive acceleration sensors have an output signal which is proportional to the acceleration and which also has a low leakage current/low leakage voltage. To convert the acceleration signal (angular acceleration by α, β and γ) into an angle signal (α, β and γ), double integration of the angular acceleration signal is required. The leakage currents or offset voltages of the acceleration sensors thus lead to a temporal drift in the result. The use of the drift filter 101 for mass and drift correction thus makes it possible to use inexpensive acceleration sensors in the movement detection unit.

After filtering with the drift filter 101 the filtered angular accelerations $\ddot{\alpha}$, $\ddot{\beta}$, and $\ddot{\gamma}$ are continuously processed with the angle processing unit 102. At the output the angle processing unit 102 delivers the angle (α, β and γ), the angular speed ($\dot{\alpha}$, $\dot{\beta}$ and $\dot{\lambda}$) and the angular acceleration ($\ddot{\alpha}$, $\ddot{\beta}$, and $\ddot{\gamma}$). The output signals of the drift filter are fed not only to the angle processing unit 102 but also the head movement recognition unit 103. The filtered angular accelerations $\ddot{\alpha}$, $\ddot{\beta}$, and $\ddot{\gamma}$ are used, for example by a comparison with a data set in a memory unit for a movement pattern, to recognise a movement pattern. The output signal 1 to N is outputted in dependence on the recognised movement pattern. The drift filter 101 and the head movement recognition unit 103 also have a first control input 104 and a second control input 105 respectively. Depending on the recognised movement pattern it may be necessary to adjust the drift filter or parameters of the drift filter in accordance with the recognised movement. For that purpose a carrier signal 106 is outputted by the head movement recognition unit 103 and fed back to the drift filter 101. Likewise an output signal of the head movement recognition unit 103 for controlling the head movement recognition unit 103 can be fed back thereto. Accordingly, as its output signals, the processing unit 100 supplies the angles $\alpha$, $\beta$, $\gamma$, the angular accelerations $\dot\alpha$, $\dot\beta$, $\dot\lambda$, the angular accelerations $\ddot\alpha$, $\ddot\beta$, and $\ddot\gamma$ as well as the pattern recognition signals (output signals of the head movement recognition unit 103) 1 to N.

Such a processing unit can generally be implemented in the form of an ASIC (application specific integrated circuit), an FPGA (filed programmable gate array), or as software on for example a DSP (digital signal processor).

FIG. 4*b* shows a block circuit diagram of a driver of a device on the basis of input signals corresponding to the output signals of the processing unit 100 (driver 120). The driver 120 has an application-specific control unit 121, an audio control unit 122, headphones 123, further control units 124 and a further device, for example a microphone 125. The output signals of the processing unit 100 serve as input signals for the driver 120. In the application-specific control unit 120 application-specific control signals are determined from the input signals and outputted. A first control signal 126 at the output of the application-specific control unit 121 is passed for example to the audio control unit 122. That therefore controls headphones 123, for example in regard to the selected piece of music or a desired volume level. Further output control signals from the application-specific control unit 121 can be passed to further control units 124 which in turn control another device, for example an MP3 player, a computer, a cockpit or the like. The control unit 124 can receive the signal from the microphone 125 and vary it in its volume and output an output signal 127.

Although in the foregoing examples reference is directed to an earphone or headphones the principle according to the invention can also be used in relation to in-ear phones, earphone receivers, headsets and in-ear monitors.

In accordance with a further embodiment of the invention which can be based on any of the above-described embodiments there is provided an activation and deactivation unit. That activation and deactivation unit can activate or deactivate the sensor device and/or the transmitting and/or receiving device. Activation or deactivation can be implemented for example by way of an operating element or actuating element for example in the form of a knob or button. As an alternative thereto the activation and deactivation unit can be activated or deactivated by a given sequence of head movements. By deactivation of detection of the head movements it is possible to ensure that control commands by error are prevented. That can be advantageous in particular if the user is involved in sporting activity, such as for example jogging. In particular deactivation can prevent vibration and shaking movements being falsely read out as control signals.

In accordance with a further embodiment angular acceleration sensors can be provided on an earphone for the detection of head movements. In that case the following movements can be associated with the corresponding control commands:

Looking upwardly: volume up
Looking downwardly: volume down
Looking left: track back
Looking right: track forward Those control commands can be implemented individually or as a control command set. In particular there can be provided an activation unit for enabling control by head movements.

In accordance with an embodiment of the invention which can be based on the preceding embodiments automatic deactivation or stoppage of transmission of the signals from the sensor devices or the sensors is effected when no head movements which can be deemed to be commands were detected over an adjustable (longer) period of time.

In accordance with a seventh embodiment of the invention which can be based on the preceding embodiments the sensors involved can be angular speed sensors, angular acceleration sensors, speed sensors and/or acceleration sensors. For example it is possible to use two angular speed sensors which are adapted to respectively detect the angular speed for a respective axis. In that case the first sensor can be so arranged that it detects the angular speed of a movement when raising or lowering the head bearing a headphone with the sensors. The second sensor can also be so arranged that it detects the angular speed of a head movement when the user directs his view towards the left or towards the right or turns the head towards the left or the right, that is to say a yaw movement takes place. Alternatively or additionally thereto it is also possible to use an angular speed sensor which outputs the angular speed of two axes. A further alternative in that respect is the use of a sensor which outputs the angular speed of three axes. Irrespective of the actual orientation of the sensor, such a three-axis sensor makes it possible to ascertain an angular speed of any desired axis of rotation, by means of a co-ordinate transformation procedure.

In addition to detection of the angular speed the angle itself of a movement of a head or a head gesture can also be used as an input signal for determining or associating commands. An absolute angle can be effected by integration of the angular speed in relation to time. Preferably a zero point should be established for the angle. That can be effected for example upon activation of the gesture control by the absolute angle being set to zero so that that position is viewed as a neutral position. If however a measurement value is ascertained by way of an integration procedure, drift problems can then occur. In that respect drift problems relate to a zero point displacement in relation to time due to minor errors in the angular speed signal. The zero point of the absolute angle can be readjusted in relation to time by high pass filtering of the calculated signal of the absolute angle.

In accordance with an eighth embodiment which can be based on one of the preceding embodiments an acoustic feedback is outputted upon a command or a control. A (special) acoustic feedback or an output of an audio signal can be associated with any recognised command. Thus for example upon activation of the sensor unit, that is to say for example when switching it on, two or more rising tones can be outputted while upon deactivation of the sensor unit, that is to say when it is switched off, two or more falling tones can be outputted. Upon an increase in volume for example one or more high tones can be outputted while upon a reduction in volume for example one or more low tones can be outputted. If for example the system is to be advanced to the next file (track forward) or the preceding file is to be called up again (track back), then for example a clicking noise can be outputted. For example a single clicking noise can be associated with an advance and a double clicking noise can be associated with a track back. Alternatively that can also be reversed. As an alternative to clicking it is also possible to output another audio signal.

In accordance with a ninth embodiment which can be based on one of the preceding embodiments selective activation of given functions or function blocks can be effected. That for example can include only volume adjustment being activated if, after activation, the user firstly looks upwardly or downwardly or the head is correspondingly inclined. Control in respect of switching reproduction forward or backward (track forward, track back) is then not possible or is deactivated. If however a movement towards the left or the right firstly occurs after activation, then for example only the function or function block 'track forward/back' can be activated. In such a case volume adjustment by error by looking upwardly or downwardly or by inclining the head is not possible or is deactivated. More extensive activation of further or other functions can be effected for example by a number of actuations of the operating element. As an alternative thereto, deactivation of gesture recognition can also be effected firstly, followed by renewed activation to enable the further functions.

In accordance with a tenth embodiment which can be based on one of the preceding embodiments, to adjust volume of the signal to be reproduced by way of the earphone, for example control commands can be sent from the earphone to a media player which then outputs the signal at the desired volume or the desired level to the earphone. As an alternative thereto volume adjustment can be effected not in the media player but in the earphone itself or in a control unit on the earphone cable. In such a case the media player can output a signal of a volume or level which remains the same, to the earphone. That signal is then only adapted for example in respect of volume in the earphone or in the control unit, on the basis of the control signals ascertained by the head gestures. In that case there can be both a wired and also a wireless connection between the earphone and the media player.

That example of volume adaptation in the earphone has the advantage that no control signals are communicated from the earphone to the media player which then in turn must implement a given action, namely volume adjustment. That is in particular further advantageous as the media player only has to output the audio signal to be reproduced to the earphone while no signal has to be communicated from the earphone to the media player. Thus the control commands to the media player can be avoided. If the user only wants to adjust the volume by head gestures it is then possible to entirely dispense with further control commands which are communicated from an earphone to the media player. In that way an earphone with internal volume adjustment can be connected to any media players, even if they cannot otherwise receive any control commands.

In accordance with an eleventh embodiment which can be based on one of the preceding embodiments, triggering of a command or an order can be effected directly by way of an angular speed derived from or detected by a sensor on the earphone. In that case the angular speed then has to be measured in order to be able to recognise a command or an order. Advantageously in that case the angular speed is measured and, if the magnitude of the angular speed exceeds a limit value or a triggering comparison value, the command or the order can then be detected as being recognised and a corresponding control command is outputted to the media player or to the earphone respectively.

In that case however the problem which can occur is that the angular speed itself, required for triggering the command, is still present after recognition of the command and thus renewed detection of a command can take place. The result of that can be for example that the system jumps not just one 'track forward' but at the same time a number of 'tracks forward'. The underlying problem is thus that, with a single head movement, a number of identical control commands can be generated if the angular speed is still evaluated unchanged to generate commands, even after the command or order has been detected. To prevent that, the magnitude of the angular speed can be monitored after detection of a command or order. If that magnitude is continuously above a comparison value such as for example a cancellation comparison value, then renewed generation of a corresponding command or order is suppressed or that command or order is not generated a second time. Renewed implementation of a command associated with that head movement is suppressed until the detected value of the angular speed falls again below the comparison value.

In that respect optionally the cancellation comparison value can be selected to be lower than the triggering comparison value. In that way it is possible to prevent a head movement which is performed at an angular speed of the comparison value leading to unwanted multiple triggering of a control command.

In accordance with a twelfth embodiment which can be based on one of the preceding embodiments a temporary block on detection or implementation of a command or order can be effected after a command or order has been previously recognised. For that purpose for example acquisition or detection of any commands can be blocked for a short period of about 0.5 second after a first command has been recognised. That is advantageous because it is possible in that way to avoid a head movement leading to multiple triggering of control commands. Thus it can further be provided that only one function is triggered at the same time. In addition it is possible in that way to prevent both a command 'track forward' and also a command 'louder' being performed for example upon a movement of the head towards the right and a simultaneous lifting movement of the head. An unwanted change in volume can be avoided. In addition the user can direct his view or his head straight ahead again during the short-term command blockage without an unwanted command being generated by the return movement.

As an alternative to blocking all commands or orders for a short period of time the blockage can only relate to the implemented command or to a function block 'louder/softer', that is to say for example if a command 'louder' has been detected, then a renewed command 'louder' or 'softer' can be blocked while other commands such as for example 'track forward' are not blocked.

In accordance with a thirteenth embodiment of the invention which can be based on one of the preceding embodiments, blockage of commands can be removed by a return movement. In this embodiment a command blockage can be removed by a movement in the opposite direction to the command direction.

If for example a user looks towards the right to cause the command 'track forward' to be carried out, then an opposite rotary movement of the head has to be performed to move back into a neutral position again. Such a movement can however be assessed as a 'track back' command. In accordance with the thirteenth embodiment, instead of corresponding recognition of a command by virtue of the opposite direction of movement to the first command, cancellation of the command blockage can be implemented. In that case, upon detection of the return movement, the angular speed can be compared to a triggering comparison value and a cancellation comparison value. Otherwise in the specified example the command blockage would admittedly initially be correctly reverted to the preceding 'track forward' command, but then in the course of the same return movement a 'track back' control command would be generated.

The mode of operation of the thirteenth embodiment is advantageous because the user can himself establish a time lapse in respect of command generation and cancellation of the command blockage without having to wait for a previously established period of time.

In accordance with a fourteenth embodiment which can be based on one of the preceding embodiments, blockage of the commands can be cancelled by a combination of a time lapse and a return movement. In that case for example a blockage can be activated after a command has been recognised, based on a head movement. If a return movement of the head is recognised, that leads to cancellation of the blockage. If however the user moves his head into a neutral position only very slowly, that can then mean that the return movement is not recognised. That can occur for example if the detected angular speed does not reach the triggering comparison value. In that case then a time lapse in respect of blockage of the commands can be used if no return movement of the head is detected.

In accordance with a fifteenth embodiment which can be based on one of the preceding embodiments adjustment of volume is effected by way of the absolute angle of inclination of the head during a head movement. In that case an inclination of the head or a position of the head in terms of activation of head control can be selected as a neutral position for the head. If a user inclines his head upwardly or downwardly, then the volume is adjusted in accordance with the detected angle of the head. If the user looks still further upwardly and correspondingly inclines the head then the volume is increased still further. If however the user looks downwardly and correspondingly inclines the head then the volume can be reduced. If the user moves his head back into the initial inclination situation or initial position again, then the volume is outputted in accordance with the initial volume. Accordingly the set volume depends on the inclination of the head. After the desired volume is reached the volume can be suitably detected and stored by pressing the activation/deactivation knob or button. Then (that is to say after actuation of the activation/deactivation knob or button) the user can perform free movements of his head without involving detection of a command.

Optionally the angle can be evaluated in steps for example in the form of 3.5°. In that case each step can be associated with a given volume step. For example a change in volume of for example 3 dB can be associated with each step. Optionally it is possible to define a range around a neutral position of the head, in which no change in volume takes place. That zone or range can be for example 5° with respect to the neutral position. That is advantageous as a raising/lowering movement of the head in that range does not lead to a change in volume.

Optionally different values can be provided for the level of the individual angle steps.

FIG. 5 shows a diagrammatic view of the division of an angle of inclination into a plurality of zones in accordance with a sixteenth embodiment. In the sixteenth embodiment which can be based on one of the preceding embodiments the detected angle of inclination can influence the speed of a change in a parameter, for example the change in volume. In that case the angles of inclination of the head can be divided into a plurality of zones. Thus for example the neutral zone can be N±8° around the neutral position. A first zone P1 can be defined between +8° and +16°, a second zone P2 between 16° and 24° and a third zone P3 above +24°. A fourth zone M1 can be defined between −8° and −16°, a fifth zone M2 between −16° and −24° and a sixth zone M3<−24°. As long as the angle of inclination is within the neutral zone (that is to say±8°), there is for example no change in volume. If however the angle of inclination of the head rises above 8° then the angle of inclination is in the first zone P1. In that case the volume can be repetitively increased stepwise for example by 3 dB in each case. There can be a period of time of for example 0.25 seconds between the individual increasing steps. The consequence of that therefore is that the volume is only slowly increased as long as the angle of inclination of the head is in the region of the zone P1.

If however the user increases the angle of inclination of the head so that the angle of inclination is in the region of the second zone P2, then the volume can be periodically increased stepwise, in which case the increase between the individual steps is within a short period of time of for example 0.175 second. That corresponds to a medium speed of increase in volume.

If however the user further increases the angle of inclination of the head (above)24° and is thus in the zone P3, the period of time between the increasing steps can be reduced to for example 0.1 second so that the volume increases more quickly.

If however the user varies the angle of inclination of the head in a downward direction and it falls below an angle of inclination of −8°, then the volume is reduced, with the speed depending on the zone in which the angle of inclination is. In the fourth zone M1 the change is slow, in the fifth zone M2 the change is medium and in the sixth zone M3 there is a fast change in volume.

When the desired volume is reached then the user only has to bring the angle of inclination of his head into the neutral zone N to stop the change in volume. Thus this embodiment does not require deactivation of command detection.

It should be pointed out that the neutral zone can also be larger than or smaller than ±8°. Equally the other zones can be larger or smaller.

Optionally the width of the zones with a positive angle can be selected to be greater than the width of the zones involving a negative angle as it is less comfortable to achieve a large angle when lowering the head. In addition optionally the widths of the zones which adjoin the neutral zone N (the zones P1 and N1) can be selected to be wider than the subsequent zones. That is advantageous because the desired adjustment of volume can be exactly set with head movements which can be comfortably carried out without having to dispense with a rapid change in volume.

Although hereinbefore three zones have been described for the positive range and three zones for the negative range it is also possible to use more or fewer zones.

In accordance with a seventeenth embodiment of the invention which can be based on one of the preceding embodiments, volume adjustment can be effected by stepwise nodding. In that case for example an increase or reduction in volume can be effected in steps of for example 3 dB upwardly or downwardly when the user directs his view or his head once upwardly or downwardly. That can be evaluated for example by way of the angular speed of that head movement axis. Triggering of commands having regard to the angular speed and a possible blockage on commands, which have been described hereinbefore, can also be employed in the seventeenth embodiment. Alternatively, the absolute detected angle can also be used for stepwise adjustment of volume. For that purpose for example each time a user raises or lowers his head by for example 10° (as the triggering angle) with respect to the neutral position the volume can be increased or reduced by one step. To further change the volume however the user must return the inclination of his head back into the neutral zone again. It is only thereafter that the volume can be altered again by renewed inclination of the head. In that case the triggering angle for increasing volume can be different from that for reducing volume. As an alternative thereto it is also possible to use corresponding equal values.

In accordance with an eighteenth embodiment which can be based on one of the preceding embodiments the above-described sensors are used for detecting head movements. In that respect it is to be noted that any movement of the head, even for generating a given command, never takes place exclusively about a single axis of rotation, but about a plurality of such axes. That does not have to be taken further into consideration where the commands are ascertained on the basis of the angular speed as the commands are determined when a comparison value is exceeded. In that case typically the angular speeds in the other axes are not exceeded. If however an angle is calculated from integration of the angular speed, then imprecise execution of a head movement can be problematical. For example it can happen that the head is inclined laterally when the head movement is intended to be performed towards the right or the left. In that case a sensor for detecting movements of the head upwardly or downwardly can be tilted out of its original measurement axis so that a part of its angular speed occurs in another axis of rotation and is thus not detected. That can therefore give rise to an angular speed measurement error. If those angular speeds were to be integrated, that can involve a shift in the zero point. Accordingly correction of the zero point shift after a left/right command can be corrected after the expiry of a period of time in respect of command blockage. That can be effected for example by the currently prevailing orientation of the head being established as a new zero point.

In accordance with a nineteenth embodiment of the invention which can be based on one of the preceding embodiments the parameters for head gesture control can be individually adapted according to the user preferences. For that purpose the earphone can be connected for example by way of an input unit or to an input unit or a PC. Alternatively or supplemental thereto the input unit can also be controlled by way of head gestures or by means of speech signals.

When using head gestures or head movements to control the input unit the user can be acoustically guided by a menu. In that case for example set questions can be answered by a head gesture (nodding for 'yes' and head shaking for 'no' or vice-versa).

For example the earphone can be connected to a PC by way of a USB port. In that case the following parameters can be adjusted:

duration of the last recognised command until automatic deactivation;
angular speed from which a 'track forward/track backward' is effected;
duration of the short-term command blockage;
possibility of selective activation, switching on or off (in accordance with the ninth embodiment);
selection between various options for volume adjustment;
sensitivity of volume adjustment in the fifteenth embodiment;
width of the zones in the sixteenth embodiment; and
angular speed or triggering angle for altering the volume in accordance with the seventeenth embodiment.

Alternatively thereto the input unit can be adapted to adjust only a limited number of parameters while all parameters are adjustable for example by way of a USB connection.

Furthermore various individually adaptable profiles can be stored for various use options and/or various individually adaptable profiles can be stored for various users. The selection of the respective profile can be effected for example by way of operating elements on the earphone. Thus for example there can be provided profiles for sport, for the office or the like.

In accordance with a twentieth embodiment of the invention which can be based on one of the preceding embodiments transmission of the gestures or head movement commands to a media player can be effected in wired mode or wirelessly (Bluetooth, WLAN, wifi, infrared, HF etc).

In the case of wired transmission of the control commands that can be effected for example by way of a jack plug (three-pole; 3.5 mm or 2.5 mm). In that case stereo audio signals can be outputted by way of the three contacts. Alternatively thereto for example it is possible to use a 4-pole jack plug if the gesture commands are to be communicated to the media player. The stereo signals can be transmitted by way of three contacts and the control signals by way of a fourth contact.

Alternatively thereto audio transmission from the media player to the earphone can be effected by way of a three-pole jack plug while transmission of the control commands from the earphone to the media player can be effected wirelessly (Bluetooth, WLAN etc). In such a case the earphone can also be connected to those media players which only have a three-pole socket. In addition transmission of the control commands can be effected by a cable with a USB plug. That is advantageous as very many media players have a USB socket and thus the media players which do not have a four-pole jack plug socket can also be controlled by gestures.

In accordance with a twenty fifth embodiment of the invention which can be based one of the preceding embodiments the sensors can be provided not only in or on an earphone but also or only in or on a remote control on the earphone cable. Alternatively thereto the sensors can also be provided for example in or on a wristwatch. In that case detection of the movements and the controls can be effected in accordance with the above-described embodiments, in which respect it is to be borne in mind that that case does not involve head movements but only arm movements in regard to the wristwatch or hand movements in regard to remote control along the cable.

The invention claimed is:

1. A control system comprising:
an earphone or headset for reproduction of audio signals which includes:
   a sensor device for detecting head movement information;
   a transmitting device for transmitting the detected movement information;
   a processing device for evaluating the movement information from the transmitting unit and for outputting at least one control command dependent on the evaluation, wherein the processing device is adapted to recognize a movement pattern from the movement information and to output at least one control command dependent on the recognized movement pattern; and
   an activation unit for activating or deactivating the sensor device and/or the transmitting device for preventing the unintentional output of control commands,
   wherein a triggering of a control command is affected directly by an angular speed detected by the sensor device,
   wherein a corresponding control command is outputted if the magnitude of the angular speed exceeds a triggering comparison value, and
   wherein a renewed generation of the corresponding command is suppressed if the magnitude of the angular speed is continuously above a cancellation comparison value.

2. A system according to claim 1, wherein the processing device has a receiving device for receiving the movement information and/or position information from a transmitting device.

3. A system according to claim 1, wherein the processing device is operable in a training mode in which the processing device can learn movement patterns and/or holding positions.

4. A system according to claim 1, wherein the at least one control signal depends on the time duration of a movement pattern or a holding position.

5. A system according to claim 1, wherein the processing device has a filter for filtering the items of movement information and position information, the filter being adapted to weight movement information more highly than position information.

6. A system according to claim 1, wherein the processing device has a compensating filter for filtering of the movement information and/or position information, wherein the filter is adapted to compensate particularities of the sensor device.

7. A system according to claim 1, wherein an acoustic feedback is outputted upon a recognized command.

8. A system according to claim 1, wherein a transmission of the signals from the sensor device or the sensor itself is deactivated or stopped when no head movement which can be deemed to be commands are detected over an adjustable period of time.

9. A system according to claim 1, wherein the cancellation comparison value is lower than the triggering comparison value.

10. A system according to claim 1, wherein the renewed generation of the corresponding command is suppressed for a predetermined period of time after the command has been recognized.

11. A method of controlling a reproduction of audio signals in an earphone or headset, the method comprising:
    detecting head movement information with a sensor device on an earphone or headset;
    evaluating the movement information with a processing unit for recognizing a movement pattern from the movement information;
    outputting at least one control command dependent on the recognized movement pattern; and
    activating or deactivating the sensor device to prevent the output of control commands by error,
    wherein a triggering of a command is affected directly by an angular speed detected by the sensor device,
    wherein a corresponding control command is outputted if the magnitude of the angular speed exceeds a triggering comparison value, and
    wherein a renewed generation of the corresponding command is suppressed if the magnitude of the angular speed is continuously above a cancellation comparison value.

12. A control method according to claim 11, comprising at least one of the following steps:
    determining head movement parameters and/or head position parameters from the movement information and/or position information;
    outputting at least one control signal dependent on the movement parameters and/or position parameters;
    evaluating movement information and/or position information for the recognition of at least one movement pattern;
    outputting at least one control signal dependent on the recognised movement pattern;
    filtering the movement information and position information in such a way that head movement information are weighted more highly than items of head position information; and
    filtering the movement information and/or position information in such a way that particularities of the sensor device are compensated.

13. A control system comprising:
    an earphone or headset for reproduction of audio signals, the earphone or headset including:
        a sensor device for detecting head movement information;
        a transmitting device for transmitting the detected movement information; and
        a processing device for evaluating the movement information from the transmitting unit and for outputting at least one control command or control signal dependent on the evaluation,
    wherein a triggering of a command is affected directly by an angular speed detected by the sensor device,
    wherein a corresponding control command is outputted if the magnitude of the angular speed exceeds a triggering comparison value, and
    wherein a renewed generation of the corresponding command is suppressed if the magnitude of the angular speed is continuously above a cancellation comparison value.

14. A method of controlling a reproduction of audio signals in an earphone or headset, the method comprising:
    detecting head movement information with a sensor device on an earphone or headset;
    evaluating the movement information with a processing unit for recognizing a movement pattern from the movement information; and
    outputting at least one control command dependent on the recognized movement pattern,
    wherein a triggering of a command is affected directly by an angular speed detected by the sensor device,
    wherein a corresponding control command is outputted if the magnitude of the angular speed exceeds a triggering comparison value, and
    wherein a renewed generation of the corresponding command is suppressed if the magnitude of the angular speed is continuously above a cancellation comparison value.

* * * * *